United States Patent [19]
Durand et al.

[11] 3,985,979
[45] Oct. 12, 1976

[54] HALF-ECHO SUPPRESSOR FOR A TERMINAL OF A FOUR-WIRE ELECTRIC LINE

[75] Inventors: Jean-Michel Durand, Le Kremlin-Bicetre; Etienne Pénicaud, Chaville, both of France

[73] Assignee: Compagnie Industrielle des Telecommunications Cit-Alcatel, Paris, France

[22] Filed: Dec. 10, 1974

[21] Appl. No.: 531,405

[30] Foreign Application Priority Data
Dec. 10, 1973 France .............................. 73.43928
Nov. 15, 1974 France .............................. 74.37705

[52] U.S. Cl. ........................... 179/170.6; 179/170.8
[51] Int. Cl.² ......................................... H04B 3/20
[58] Field of Search ............ 179/170.2, 170.6, 170.8

[56] References Cited
UNITED STATES PATENTS

| | | | |
|---|---|---|---|
| 3,280,274 | 10/1966 | Schoeffler | 179/170.2 |
| 3,351,720 | 11/1967 | Brady | 179/170.2 |
| 3,673,355 | 6/1972 | La Marche et al. | 179/170.6 |
| 3,754,105 | 8/1973 | Poschenrieder et al. | 179/170.2 |
| 3,823,275 | 7/1974 | La Marche et al. | 179/170.2 |
| 3,896,273 | 7/1975 | Fariello | 179/170.6 |

*Primary Examiner*—Kathleen H. Claffy
*Assistant Examiner*—Randall P. Myers
*Attorney, Agent, or Firm*—Sughrue, Rothwell, Mion, Zinn & Macpeak

[57] ABSTRACT

The invention comes within the field of four-wire telephony. To avoid the closing of a loop between the two unidirectional channels, a half-echo suppressor is provided for each terminal, which comprises mainly a speech detector for the emitting channel, said speech detector having two operational modes: the first sends out a speech indicator signal based on the characteristics of amplitude and sign change on the emitting channel whereas the second compares the amplitude on the emitting channel and the amplitude on the receiving channel and is effective when the receiving channel is active. The invention applies more particularly to a PCM network in combination with a concentrator which uses the inactivity periods of the circuits.

10 Claims, 1 Drawing Figure

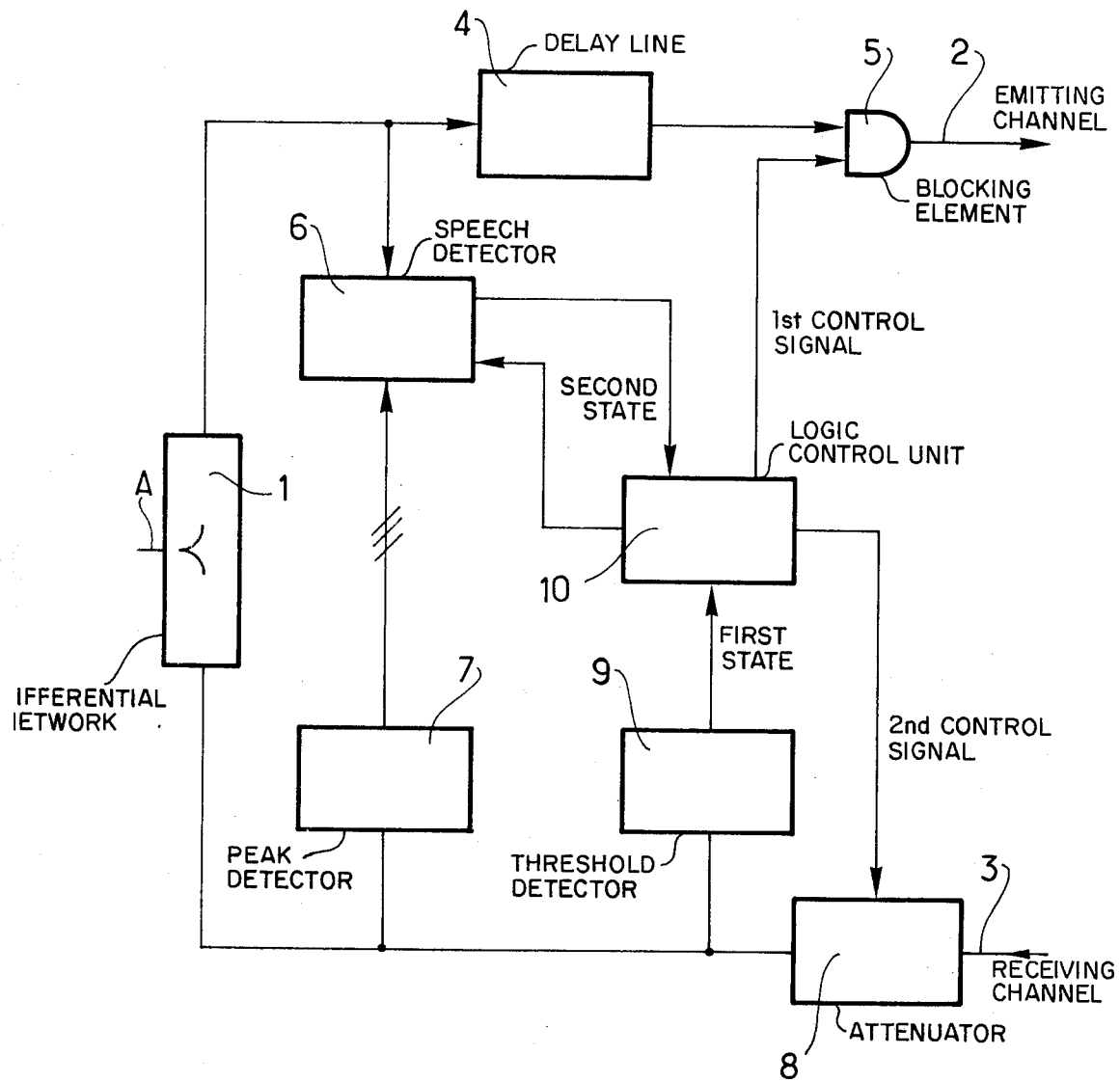

HALF-ECHO SUPPRESSOR FOR A TERMINAL OF A FOUR-WIRE ELECTRIC LINE

The present invention concerns a half-echo suppressor and the use thereof in telephonic transmission systems having appreciable delays in loops in the voice-frequency channel.

In numerous communication systems, it is usual to interconnect in a terminal local two-wire lines to four-wire lines by means of a differential network or any other separation network. The four-wire system provides a separate unidirectional channel for emitting and for receiving the signals exchanged between terminals, whereas the local two-wire circuits provide a single bi-directional channel between the terminal and the user. As the differential network is never ideal, a part of the signal transmitted is sent back to the emitter terminal and makes itself felt as an echo when the loop delay is not negligible.

That delay may be due to the distance between the two communicating subscribers and it may also be due to the existence of a concentrated delay line which is used in modern networks to enable the processing of the voice signal with a view to a companding of the data and to a better use of the lines.

It is a known method to insert in such a case at each terminal a half-echo suppressor which senses the engaged state of the two channels and effectively electrically inserts in the transmission channel a blocking element when the near subscriber is not speaking and, in the receiving channel, an attenuator when the near subscriber is speaking. Certain echo suppressors allow the near subscriber to speak while the far subscriber is speaking, and echo suppressors which are specially adapted to PCM digital networks in which the vocal waves are decomposed into samples whose amplitudes are digitally coded, are also known.

Known echo suppressors therefore generally comprise:

a. on the emitting channel, a blocking element and a speech detector;
b. on the receiving channel, an attenuator and another speech detector and;
c. a control device for the blocking element and the attenuator which compares the signals coming from the two detectors.

The invention aims at reducing the complexity and the cost of such a suppressor and should enable, more particularly, the integration thereof in a data companding device which already needs a highly improved speech detector and a delay line on the emitting channel.

The invention concerns an echo semi-suppressor for a terminal of a four-wire telephone line having an emitting channel and a receiving channel, comprising:

a controlled blocking element electrically insertable in the emitting channel;
a controlled attenuator electrically insertable in the receiving channel;
means for sensing the signal on the receiving channel downstream from the attenuator;
a speech detector for detecting the signal on the emitting channel upstream from the blocking element, said speech detector being connected to said sensing means and having two operational modes in the first of which it sends out an activity signal based on characteristics of amplitude and change in sign on the emitting channel and in the second of which it sends out an activity signal based on a comparison between the amplitude on the emitting channel and the amplitude on the receiving channel and,
a logic control element receiving, from said speech detector and from said sensing means, data concerning the state of the emitting and receiving channels respectively for controlling said blocking element, said attenuator and the operation mode of the speech detector; in a first example of embodiment, the speech detector operates in the second mode when the receiving channel is active and the emitting channel is inactive; in a second example of embodiment, the speech detector operates in the second mode when the receiving channel is active, whatever the state of the emitting channel may be.

In an echo semi-suppressor according to the invention, the data concerning the state of the receiving channel is generated preferably in a simple fixed threshold detector.

In a preferred embodiment of the invention, the speech detector is fed in the second mode of its operation by a peak detector for the telephone signal on the receiving channel.

As will be seen herebelow, the invention is particularly suitable for a PCM telephone system. In that case, all the components of the half echo suppressor are formed according to the digital technique.

The invention will be described hereinbelow in greater detail with reference to the single accompanying FIGURE which shows a block diagram of a half-echo suppressor according to the invention. As it is possible to show the first and second examples of embodiment of the invention diagrammatically in the same way, the FIGURE concerns both cases.

Only the equipment of one terminal is considered hereinafter. It is evident that it will be necessary to have the equivalent at the other end. A subscriber A who is considered as the near subscriber is connected to a differential network 1 by a bi-directional line having two wires. That network connects together the four wires of the terminal, two of which belong to the emitting channel 2, the other two belonging to the receiving channel 3. In the emitting channel, there is a delay line 4 and a blocking element 5. That channel also feeds a speech detector 6 which may form an integral part of a concentrator intended for attributing the emitting channel to other subscribers when the subscriber A is not speaking.

As will be seen hereinbelow in detail, that detector has two modes of operation, a first of which corresponds to its function in a concentrator and a second of which, being more simple, corresponds to a detection threshold as a function of the state of the signals on the receiving channel. For these purposes, it is connected to a peak detector 7 which supervises the receiving channel.

In the receiving channel, a constant weakening attenuator 8, by 6 dB, for example, is effectively inserted when the subscriber A speaks. The receiving channel feeds, downstream from that attenuator, an amplitude detector 9 having a fixed threshold which sends out to a logic control unit 10 a binary signal when the amplitude on the receiving channel exceeds that threshold. That logic control unit compares the signal coming from the detector 9 with a binary signal coming from the speech detector 6 and deduces therefrom the instruction signals for making the blocking unit 5 or the attenuator 8 active or for changing the mode of operation of the speech detector.

That speech detector is one of the essential elements of a concentrator system which uses the inactivity periods of the circuits. Its function is to discriminate the speech signal from the silences and from the noise in order to know if a telephonic circuit is active or not. In its normal mode of operation (first mode), it detects the speech by using characteristics relating to the amplitude and characteristics relating to changes to zero. Such a detector is described, for example, in U.S. Pat. No. 3,825,694 of July 23, 1974. The logic control unit therefore receives a binary signal which shows the presence or absence of speech, contingently taking into account a certain hangover time after the disappearance of the speech.

In the second mode of operation, that speech detector uses only characteristics related to the amplitude, but contrary to the previous case, in which a fairly low and fixed threshold of the amplitude is applied, just enough to distinguish a low level of speech noise, here, a threshold which is a function of the level of the receiving channel, is used. That threshold is generated in the peak detector 7.

The delay line 4 may have a delay in the order of 20 milliseconds and compensates the delay due to the detection of the speech before the speech is recognized with certainty. That delay line may also be necessary to enable the transmission of the service signals in the concentration system.

The fixed threshold amplitude detector 9 uses, as the only detection characteristic, the amplitude on the receiving channel. As soon as the peak level is higher than a certain fixed value, it sends out immediately an activity signal. That value may be −31 dBmo. The detector has a hangover time of 50 milliseconds.

The peak detector 7 develops a code which is a function of the amplitude on the receiving channel. That code fulfills the function of a threshold for the speech detector 6 in its second mode of operation. In a preferred embodiment, the peak detector has a hangover time such that it undergoes a lowering of the amplitude only after the latter has been confirmed during a certain time which may be 50 milliseconds; it is then advantageous, for the peak detector 7, to be reset each time the logic control unit cuts in the attenuator 8, so that the peak detector 7 may take into account immediately the lowering of the amplitude corresponding to that cutting in; in that case, not shown in the FIGURE, the peak detector is connected to the logic unit to receive control signals for resetting.

The blocking element 5 may be a binary gate which, under the control of a signal coming from the logic control unit 10, allows or does not allow the passing of the signals coming from the delay line 4.

The logic control unit 10 receives binary signals from the speech detector 6 and from the amplitude detector 9 and it controls the operation of the speech detector 6, of the blocking element 5 and of the attenuator 8. That logic unit will be described in full detail hereinbelow by setting forth the operation thereof.

In the first example of embodiment of the invention, the logic unit 10 operates in such a way that the four following states may be distinguished in the half-echo suppressor;

1. Rest: Neither of the two subscribers is speaking; the speech detector 6 and the detector 9 indicate no speech. The blocking element 5 and the attenuator 8 are out of circuit and the speech detector is in its normal operation mode (first mode).

2. The far subscriber, only, speaks: In that case, the attenuator 8 is out of circuit; the blocking element 5 is in circuit, the amplitude detector 9 indicates speech and the speech detector 6 indicates no speech. The speech detector 6 is in its second operation mode in which its detection threshold is a function of the code coming from the peak detector 7. If the far subscriber stops speaking, the logic control unit restores the rest state.

3. Break-in mode: If, on the other hand, the near subscriber speaks when the far subscriber speaks, he needs a powerful voice to exceed the threshold displayed by the detector 7. In that case, the blocking element 5 is removed from the circuit and the attenuator 8 is cut into the circuit despite the speech on the receiving channel. It will be seen therefore that the break-in control is possible only after the second state, that is, when the far subscriber, only, speaks. Break-in necessarily leads to the following state.

4. The near subscriber speaks: In that case, the speech detector 6 operates normally and sends out an activity signal. The blocking element is out of circuit and the attenuator is in circuit independently from the state of the receiving channel, the signal leaving the amplitude detector 9 therefore having no importance.

Such a half-echo suppressor ensures a suppression of echo which is very effective on telephone lines which are not very noisy. Nevertheless, when the emitting channel is very noisy (switching noises, cross-talk . . . ) the speech detector of that channel may become active under the effect of the noise. If the receiving channel is also active, the echo of the signals of that channel may extend the activity of the detector on the emitting channel, thereby preventing the putting into service of the blocking element; that echo is then not suppressed.

The second example of embodiment of the invention enables effective suppression of the echo even on very noisy telephone lines.

In relation to the first example described, only the logic control unit 10 is designed differently. Here again, it receives binary signals from the speech detector 6 and from the amplitude detector 9 to control the operation of the detector 6, of the blocking element 5 and of the attenuator 8; nevertheless, these controls are effected in such a way that it is possible to distinguish, for the corresponding half-echo suppressor, one of the following four states:

a. Rest: Neither of the two subscribers is speaking; the speech detector 6 and the detector 9 indicate no speech. The blocking element 5 and the attenuator 8 are out of circuit and the speech detector is in its normal operation mode (first mode).

b. The far subscriber, only, speaks: In this case, the attenuator 8 is out of circuit; the blocking element 5 is in circuit; the amplitude detector 9 indicates speech and the speech detector 8 indicates no speech. The speech detector 6 is in its second mode of operation in which its detection threshold is a function of the code coming from the peak detector 7.

c. The near subscriber, only, speaks: In this case, the speech detector 6 operates normally according to the first mode and sends out an activity signal whereas the amplitude detector 9 indicates inactivity. The blocking element is out of circuit and the attenuator is in circuit. When the emitting channel becomes inactive, the logic control unit contingently keeps the attenuator 8 in circuit for a certain time TM whose value, which may be up to 1 second, is determined according to the nature of the transmission; the logic element subsequently restores the rest state.

d. Double speech: The two subscribers speak; the speech detector 6 and the amplitude detector 9 each send out an activity signal. The blocking element 5 is out of circuit and the attenuator 8 is in circuit despite the existence of speech on the emitting channel. The detector 6 operates according to the second mode. If the emitting channel then becomes inactive, the receiving channel remaining active, contingently after the hangover time TM the attenuator is put out of service, the blocking element is inserted in the emitting channel and the state (b) is observed again. If the far subscriber stops speaking first, the logic control unit restores the state (c).

If the speech detector 6 is active under the effect of the noise, whereas the receiving channel is active, it is no longer possible for the echo of the signals of that channel to extend the activity of that detector, the latter then operating according to the second mode, in which the speech detection threshold is a function of the signals on the receiving channel.

The invention has been implemented, in practice, in a PCM system. In such a system, an attenuator is formed by a transcoder. A delay line is formed as a shift register and a speech detector is a small specialized computer which handles and accumulates the digital values. A particularly advantageous application consists in combining the digital half-echo suppressor described hereinabove with a concentrating device which uses the inactivity periods of the circuits. It is also possible to connect with that half-echo suppressor, a tone disabler which makes it possible to inhibit all echo suppressor action when bi-directional simultaneous transmission of the data, for example in the connection between data sources and a computer, are observed.

But it is evident that the invention is not limited to that embodiment. It is possible, more particularly, to remain in analog technique or to combine the half-echo suppressor with other devices for processing the signals on a telephone channel.

What is claimed is:

1. Half-echo suppressor for a terminal of a four-wire telephone line having an emitting telephonic signal channel and a receiving telephonic signal channel, comprising:

first means receiving the signal on the emitting channel for blocking this signal or passing it according to a first control signal applied thereto;

second means receiving the signal on the receiving channel for attenuating this signal or passing it unaltered according to a second control signal applied thereto;

third means fed with the signal on the receiving channel downstream from said second means, for generating a first state signal representative of the state of the receiving channel;

fourth means fed with the signal on the receiving channel downstream from said second means, for providing data concerning the amplitude on the receiving channel;

a controlled speech detector means fed with the signal on the emitting channel upstream from said first means, for generating a second state signal representative of the state of the emitting channel, said speech detector means having two operational modes in the first of which said second state signal represents characteristics of amplitude and change in sign on the emitting channel, and in the second of which said second state signal represents a comparison only between the amplitude on the emitting channel and the amplitude on the receiving channel, the data concerning the latter amplitude being that provided by said fourth means; and logic control means, receiving said first and second state signals, for providing said first and second control signals and for controlling the mode of operation of said speech detector means, the latter operating according to the second mode only when the receiving channel is active and regardless of the state of the emitting channel.

2. Half-echo suppressor according to claim 1, in which said third means comprises a fixed threshold detector, coupled to said receiving channel downstream from said second means, for generating said first state signal.

3. Half-echo suppressor according to claim 2, in which said fourth means comprises a peak detector coupled to said receiving channel downstream from said second means, for generating the amplitude data.

4. Half-echo suppressor according to claim 1 in which the transmission on the emitting channel and receiving channel is effected in the form of binary pulses which signify codes for sampled amplitudes of the telephonic signal, all the components of the half-echo suppressor being formed according to digital techniques.

5. Half-echo suppressor according to claim 1, wherein said speech detector means operates according to the second mode only when the receiving channel is active and while the emitting channel is inactive.

6. Half-echo suppressor according to claim 5, in which said third means comprises a fixed threshold detector, coupled to said receiving channel downstream from said second means, for generating said first state signal.

7. Half-echo suppressor according to claim 6, in which said fourth means comprises a peak detector coupled to said receiving channel downstream from said second means, for generating the amplitude data.

8. Half-echo suppressor according to claim 7, in which the transmission on the emitting channel and receiving channel is effected in the form of binary pulses which signify codes for sampled amplitudes of the telephonic signal, all the components of the half-echo suppressor being formed according to digital techniques.

9. Half-echo suppressor according to claim 5, in which said fourth means comprises a peak detector coupled to said receiving channel downstream from said second means, for generating the amplitude data.

10. Half-echo suppressor according to claim 1, in which said fourth means comprises a peak detector coupled to said receiving channel downstream from said second means, for generating the amplitude data.

* * * * *